(12) United States Patent
Prohofsky

(10) Patent No.: US 10,176,212 B1
(45) Date of Patent: Jan. 8, 2019

(54) TOP LEVEL TIER MANAGEMENT

(71) Applicant: Seagate Technology LLC, Cupertino, CA (US)

(72) Inventor: Thomas R Prohofsky, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 928 days.

(21) Appl. No.: 14/515,466

(22) Filed: Oct. 15, 2014

(51) Int. Cl.
*G06F 17/30* (2006.01)

(52) U.S. Cl.
CPC .............................. *G06F 17/30371* (2013.01)

(58) Field of Classification Search
CPC ................................................ G06F 17/30221
See application file for complete search history.

(56) References Cited

U.S. PATENT DOCUMENTS

| | | | |
|---|---|---|---|
| 8,240,565 B2 | 8/2012 | Iizuka | |
| 8,271,559 B2 | 9/2012 | Shoji et al. | |
| 8,315,995 B1 | 11/2012 | Levy | |
| 8,341,340 B2 * | 12/2012 | Rub | G06F 12/0246 711/103 |
| 8,417,688 B2 | 4/2013 | Abbondanzio et al. | |
| 8,560,793 B2 | 10/2013 | Jennas et al. | |
| 8,560,799 B2 | 10/2013 | Nasu et al. | |
| 8,700,583 B1 | 4/2014 | Lesiewicz et al. | |
| 8,713,267 B2 | 4/2014 | Martin | |
| 8,725,936 B2 | 5/2014 | Oikawa | |
| 8,760,922 B2 | 6/2014 | Lassa | |
| 8,788,778 B1 | 7/2014 | Boyle | |
| 9,459,809 B1 * | 10/2016 | Chen | G06F 3/0644 |
| 9,477,431 B1 * | 10/2016 | Chen | G06F 3/0689 |
| 2008/0005317 A1 | 1/2008 | Diao et al. | |
| 2013/0124780 A1 | 5/2013 | Baderdinni et al. | |
| 2013/0145095 A1 | 6/2013 | McKean et al. | |
| 2014/0208017 A1 | 7/2014 | Benhase et al. | |
| 2014/0208021 A1 | 7/2014 | Benhase et al. | |

* cited by examiner

*Primary Examiner* — Cheryl Lewis
(74) *Attorney, Agent, or Firm* — Cesari & Reed, LLP; Kirk A. Cesari; Christian Best

(57) ABSTRACT

Systems and methods are disclosed for management of a tiered storage system by a top tier storage device. In some embodiments, an apparatus may comprise a circuit configured to maintain an address map at a first storage tier, receive a read request for specified data, return the specified data when the data exists on the first storage tier, and when the specified data does not exist on the first storage tier, return an indication to query a second storage tier. The circuit may be further configured to determine infrequently accessed cold data stored to the first tier, provide to a host device a copy of the cold data stored in an area of the first storage tier scheduled for defragmentation, and perform the defragmentation operation, including copying valid data to an available area of the first storage tier, the valid data not including the cold data.

20 Claims, 11 Drawing Sheets

TOP LEVEL TIER MANAGEMENT

SUMMARY

In certain embodiments, an apparatus may comprise a circuit configured to maintain a first address map for a first storage tier having a first type of storage medium, receive a read request for specified data, return the specified data when the data exists on the first storage tier, and return an indication to query a second storage tier having a second type of storage medium when the specified data does not exist on the first storage tier.

In certain embodiments, a system may comprise a first storage tier including a first storage device having a first type of storage medium, a second storage tier include a second storage device having a second type of storage medium, and a controller. The controller may be configured to direct a read request for specified data to the first storage tier, receive an indication from the first storage tier to query the second storage tier when the specified data is not stored to the first storage tier, and direct a read request for the specified data to the second storage tier.

In certain embodiments, an apparatus may comprise a data storage device of a first storage tier including a first type of storage medium different from a second type of storage medium of a second storage tier, and a means for managing a tiered data storage system having the first storage tier and the second storage tier, including receiving data access requests for the first storage tier and the second storage tier, and sending an indication to query the second storage tier for requested data not stored to the first storage tier.

DETAILED DESCRIPTION

Figure 1:
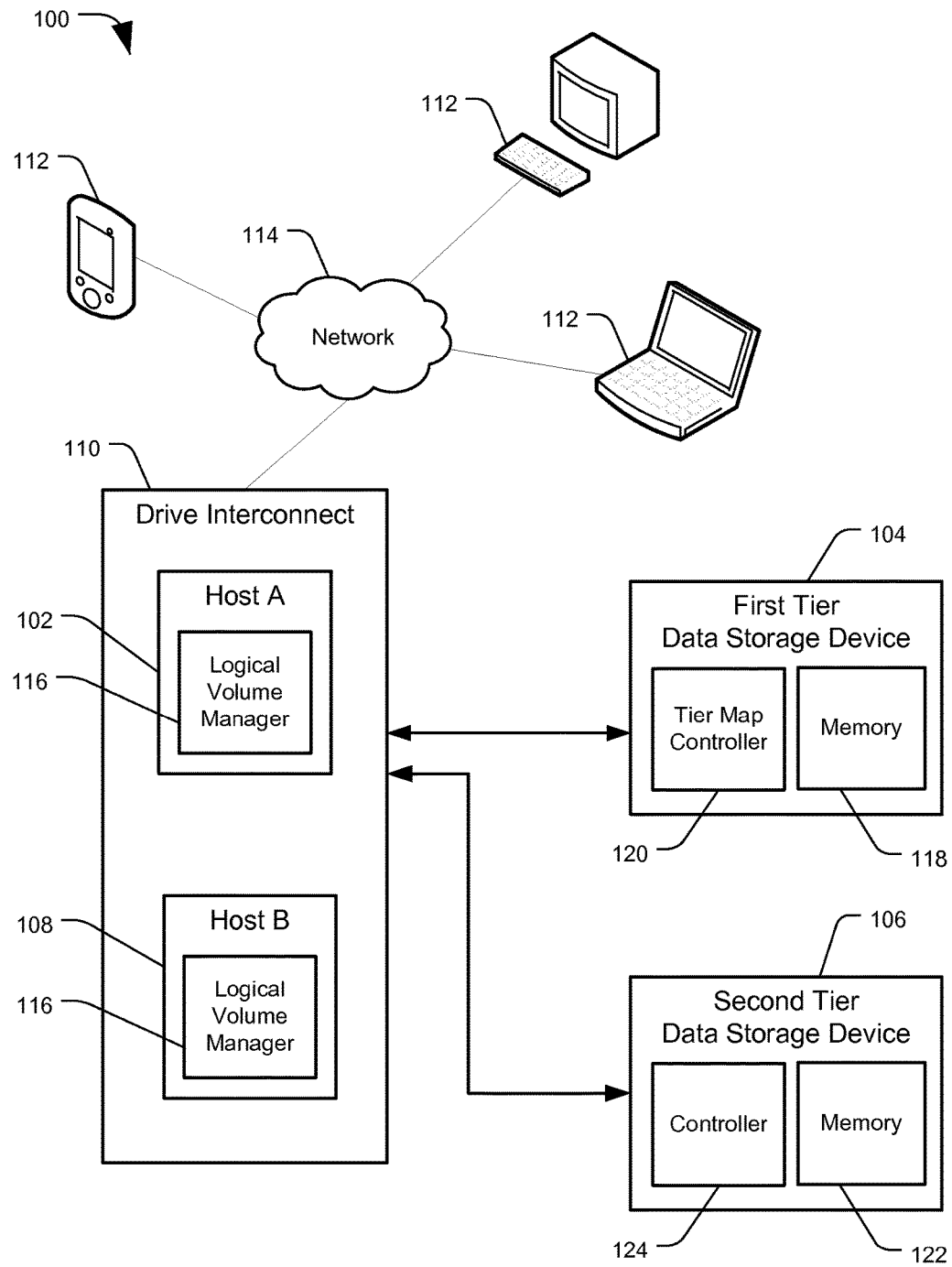
FIG. 1 is a diagram of a system for top level tier management, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Different types of data storage mediums may have different characteristics, such as random access speeds, sequential access speeds, cost, reliability, other factors, or any combination thereof. For example, solid state devices (SSDs) may provide a random access performance advantage over hard disc drives (HDDs), but SSDs may also be more expensive and suffer from wear during program and erases cycles. Various storage architectures may combine different types of storage mediums to take advantage of the benefits of each medium while balancing the downsides of those mediums. For example, some storage architectures may employ a first amount of solid state memory for frequently accessed data benefiting from rapid access, and employ hard drives where total storage capacity is more important than random access speeds. Two architectures for combining SSDs and HDDs include caching and tiering.

Caching may include storing a copy of data to a faster memory, and periodically updating a slower memory with the most recent data from the cache. The cache memory may be a partial second copy of data stored in the addressable storage space, and may not be listed as part of the total user storage capacity of a memory above the capacity of the slower memory.

An architecture employing tiering may include both faster memory and slower memory, and the storage capacity of the system may include the total user storage capacity of both memories. Frequently accessed data may be stored to the faster memory, and less frequently accessed data may be stored to the slower memory. Data may be migrated between the different tiers of memory storage based on an access history of the data. In some embodiments, memories may be selected for caching or tiering based on characteristics besides random access speeds, such as storage reliability, sequential access speed, cost, or other factors.

As the cost of SSDs and other high-performance memories comes down, the percentage of those memories in the storage mix may increase. As the percent of SSDs becomes larger the cost of caching may increase, since cache memory maintains a shadow copy of data from the HDD storage, and does not increase the usable capacity of the storage system like tiering. Systems and methods for improving tiered storage systems may be desirable, including improving performance, reducing complexity, reducing the need for redundancy, and reducing wear to memories such as solid state memories. In some embodiments, the systems and methods may be employed to improve performance of systems including caching as well.

FIG. 1 is a diagram of a system 100 for top level tier management, in accordance with certain embodiments of the present disclosure. The system 100 may include host A 102, a first tier data storage device (DSD) 104, and a second tier DSD 106. The host 102 may also be referred to as the host system or host computer. The host 102 can be a desktop computer, a laptop computer, a server, a tablet computer, a telephone, a music player, another electronic device, or any combination thereof. In some embodiments, host 102 may be one or more control boards, processors, or circuits. In some embodiments, a second host device, host B 108, may also be included in the system. For example, host A 102 and host B 108 may be included in drive interconnect 110 and may comprise compute nodes connected to the tiered storage system including first tier 104 and second tier 106. In some embodiments, more than two hosts may be included in system 100. Multiple hosts may provide failover in case of a compute node fault. If one of host A 102 or host B 108 were to fail, become overloaded with commands, or otherwise incapable of servicing a workload, the other host device may service the workload.

On some embodiments, host A 102 or drive interconnect 110 may comprise a server control system or processing center system, and may receive and service commands for user devices 112 through network 114. In some embodiments, host A 102 may be a user device issuing commands independent of external devices 112.

In some embodiments, host A 102, host B 108, or both may include a logical volume manager (LVM) 116. In some embodiments, the tiered storage system including first tier 104 and second tier 106 may have a total usable storage capacity of a given size. The total usable storage capacity may be divided among a plurality of physical storage mediums and different storage tiers. The total capacity may also be divided into logical volumes, and each logical volume may include a fraction of a given storage medium, multiple storage mediums, or any other division. An operating system (OS) on host A 102 may perceive the total usable storage capacity of the tiered storage system as a single logical volume, or multiple different volumes. Host commands to access the storage system may be passed through the LVM 116, which may have information to determine to which storage device or devices to direct particular commands. For example, a host system may track files using logical block addresses (LBAs). Host A 102 may request a file at LBA 200, which command is passed to the LVM 116. Each range of LBAs may be associated with a particular logical volume, or with one or more particular storage devices. The LVM 116 may determine that commands for LBA 200 are associated with first tier DSD 104, and direct the command accordingly. The LVMs in Host A and Host B may or may not be synchronized to be cluster-aware of other hosts, or to run independently. In some embodiments, the LVMs may be synchronized to allow concurrent access to the same storage location.

First tier DSD 104 and second tier DSD 106 may include any types of devices used to store or retrieve data, such as SSDs, HDDs, hybrid hard drives (HHDs), other memories, or any combination thereof. While a single first tier DSD 104 and second tier DSD 106 are depicted, each tier may include multiple storage devices. In some embodiments, multiple storage mediums and multiple memory tiers may be included in a single storage device. In some embodiments, a given tier may include different types of storage devices. For example, a first tier may include different types of solid state memory, while a second tier may include HDDs, tape drives, SSDs, other drives, or any combination thereof. In some examples, first tier 104 may include one or more NAND flash memories, while second tier 106 could be a network attached storage pool like an internet small computer system interface (iSCSI) device or Fibre Channel logical unit number (LUN). In addition, a tiered storage system may include more than two tiers of storage, such as a third tier and a fourth tier, with devices selected for given tiers based on desired tiering criteria.

Host A 102, host B 108, first tier DSD 104, and second tier DSD 106 may be connected by way of a wired or wireless connection, or by a local area network (LAN) or wide area network (WAN), any other network configuration, or any combination thereof. In some embodiments, one or more host devices 102, 108 and tiered DSDs 104, 106 may be part of a single unit (e.g. a computer having tiered internal memories). Other embodiments are also possible.

First tier DSD 104 may include a memory 118 and a tier map controller 120. The memory 118 may comprise one or more data storage media, including nonvolatile solid state memories such as NAND flash memory, disc drives, other types of memory, or a combination thereof. Second tier DSD 106 may similarly include a memory 122 and a controller 124. Second tier memory 122 may also comprise one or more data storage media, including nonvolatile solid state memories such as NAND flash memory, disc drives, tape drives, other types of memory, or a combination thereof. In some embodiments, first tier memory 118 may provide some performance advantage over second tier memory 122, such as superior random access rates, higher reliability, lower power consumption, other advantages, or any combination thereof.

Second tier controller 124 may comprise one or more circuits or processors configured to control operations of second tier DSD 106, such as storing data to or retrieving data from the second tier memory 122. For example, second tier DSD 106 may receive read or write requests, processing requests, or other requests from host A 102 (or host B 108), and use controller 124 to process or service the requests. In some embodiments, controller 124 may maintain a "heat map," which may be a log of data requests or accesses for data stored to memory 122 and which can be used to monitor which data is frequently accessed "hot data," and which data is infrequently accessed "cold" data. The access log may be used to determine data to be promoted to a higher storage tier.

Tier map controller 120 may include similar components and perform similar operations to second tier controller 124. For example, tier map controller 120 may comprise one or more circuits or processors configured to control operations of first tier DSD 104. In addition, tier map controller 120 may perform top level tier management operations for the tiered storage system, such as those described in relation to FIGS. 7, 8, and 9. For example, tier map controller 120 may receive initial data access requests directed to the tiered storage system from a host computer. For example, a data access request may specify a logical block address (LBA) for the data, and the tier map controller 120 may consult an address map to locate the data based on the LBA. With regard to a read request, the tier map controller 120 may determine whether the requested data is stored to the first tier memory 118 by consulting address mapping information. If the requested data is not stored to the first tier DSD 104, the tier map controller may direct the requesting host device to query the second tier DSD 106 for the requested data. Functionality of the tier map controller 120 may be incorporated into the flash translation layer, according to some embodiments.

In some embodiments, the tier mapping controller 120 may maintain a mapping table for only the first tier memory 118, and requests for data not included in the first tier are directed to a next lowest tier, such as second tier DSD 106. In some embodiments, the tier map controller 120 may maintain mapping information for the entire tiered storage system, or a subset thereof, and may direct requests for data to a lower tier, a subset of lower tier memories, or even to a specific memory based on the address mapping information. For example, each tier may include multiple data storage devices. A given device in the first tier may manage a subset less than all of the devices in a lower tier. Other embodiments are also possible.

The tier map controller 120 may also perform defragmentation or "garbage collection" operations on the first tier memory 118. Defragmentation or garbage collection operations may include copying valid data from a first area of the memory 118 to a different area of the memory, and erasing or clearing the first area. For example, if memory 118 is a NAND flash memory, data may be stored in units of one or more blocks, and data may be stored to each block in discrete units of pages or sub-pages. Map units may be the smallest addressable unit of storage on the flash memory, and may correspond to pages or sub-pages of a flash memory. For example, each map unit may be 4 KB, each page may include four map units and be 16 KB in size, and a block may include 64 pages. In some embodiments, pages may be the smallest addressable unit and may therefore be the map units. Map units may be filled over time as data is received for writing, and the map units may be marked as invalid if the corresponding data is designated for erasure, or if a more recent version of the data is stored elsewhere. However, to actually erase data, and to recapture pages marked as invalid, the flash memory may need to delete all data in an entire block. Defragmentation or garbage collection may include copying valid data from a first block and storing it to pages of another block, then deleting the data from the first block. A unit of memory that is cleared in a defragmentation operation may be referred to as a "garbage collection unit" (GCU). A GCU can be a selected area of memory, or any amount of data space or data storage, either in units of storage capacity or based on units of storage architecture. For example, a GCU may be a single flash block, multiple flash memory blocks (e.g. across one or multiple physical NAND Flash devices), a band of disc tracks recorded in a shingled manner, other units, or any combination thereof. For example, blocks from multiple NAND die may be grouped together in a single GCU, and all the grouped blocks may be cleared and erased in a single or combined operation.

The first tier memory controller 120 may maintain a heat map for data stored to the memory 118, which may store information on data accesses and can be used to determine which data is infrequently accessed "cold" data. For example, a heat map may include a data access log or mapping table with metadata related to a number or frequency of accesses to the mapped data. "Cold" data may refer to data that is infrequently accessed, based on number of accesses, recency of accesses, other statistics, or any combination thereof, or is otherwise categorized as less desirable to store in a high tier of a tiered storage system. Conversely, "hot" data may refer to data that is accessed often, has been accessed recently, or is otherwise characterized as important or useful to store for fast retrieval, e.g. by storing in a fast-access NAND flash memory.

A data storage device may monitor GCUs to determine when to perform defragmentation operations. For example, a GCU that contains a threshold number of invalid sectors, that contains the most amount of invalid sectors among the GCUs, other criteria, or any combination thereof, may be selected for a defragmentation operation. When a GCU has reached or is approaching a defragmentation trigger threshold, a DSD may select the corresponding memory area and evaluate the data in the GCU for infrequently accessed data. In some embodiments, the DSD may continually monitor the hot or cold status of data, regardless of the state of any particular GCU.

When a GCU scheduled for defragmentation contains cold data, the tier map controller 120 may direct that the data be read and stored to the second tier DSD 106. For example, the first tier DSD 104 may notify a host of the cold data, either autonomously prior to performing garbage collection, or in response to an infrequently accessed data query, or cold data query, from the host. The host may then read the cold data, and issue a write command for the cold data to the second tier DSD 106. Upon successful acknowledgement of storing the write data on DSD 106, the host may issue a TRIM or UNMAP command to DSD 104 to indicate the data is safe to erase, completing the data move. By demoting the cold data to a lower tier prior to performing garbage collection, write amplification (e.g. performing unnecessary copying of data that will be moved to a lower tier) and storage media wear can be reduced.

In some embodiments, first tier DSD 104 may include a separate memory controller (not shown) to control data accesses to memory 118, while tier map controller 120 may control determinations of which data accesses to service at the top tier, and which data accesses to redirect to a lower tier. In some embodiments, a tiered storage system may include three or more data storage tiers. The top storage tier may redirect data accesses for data not in the top tier directly to a third or lower tier. In some embodiments, the second tier controller 124 may include functionality of the tier map controller 120, and govern requests for lower tiers. For exactly, a data miss to the first tier DSD 104 may be redirected to the second tier DSD 106, whereupon the second tier controller 124 may determine whether the requested data is on the second tier memory 122, or if the request should be redirected to a third tier. Other embodiments are also possible.

Figure 2:
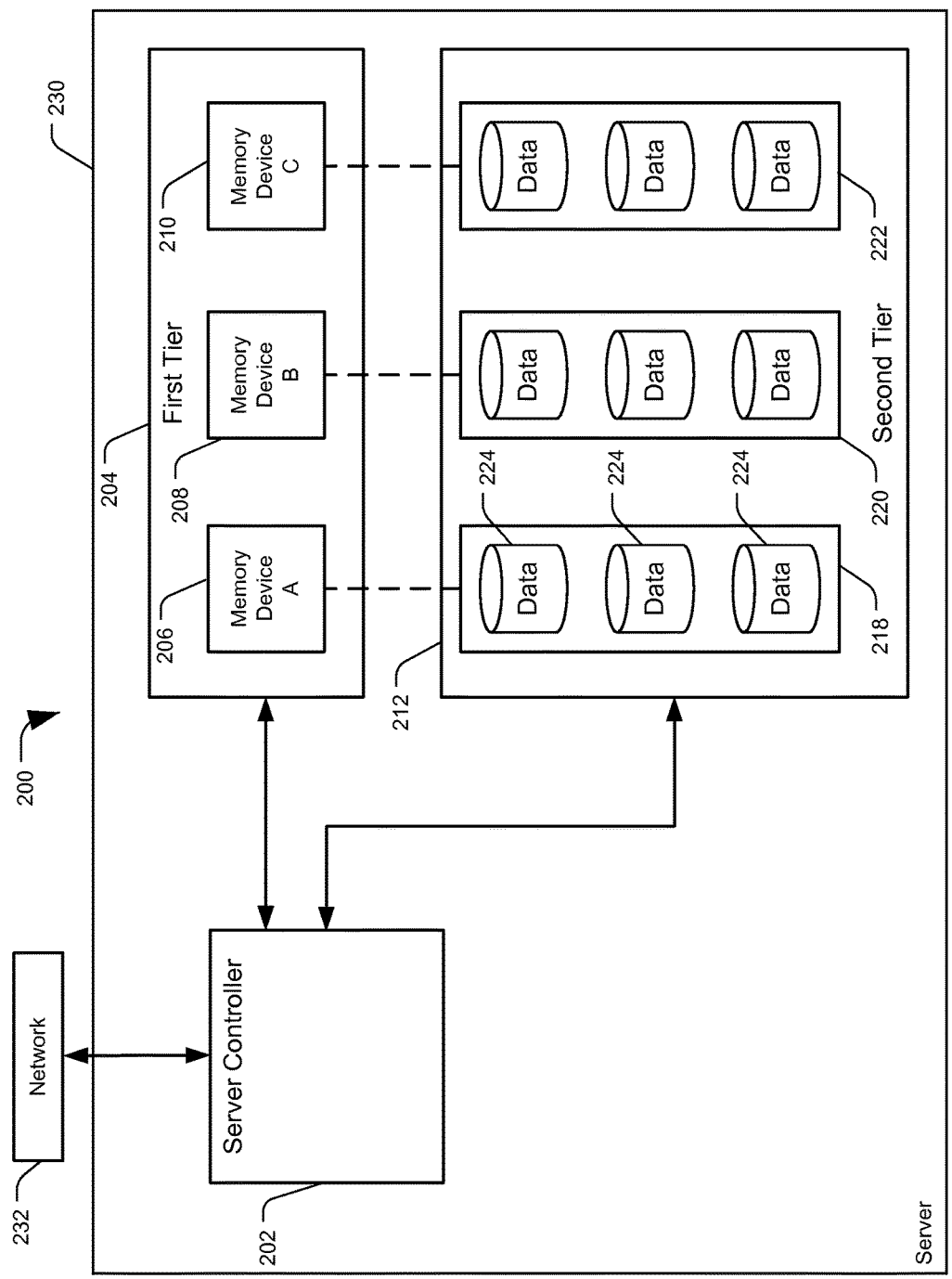
FIG. 2 is a diagram of a system for top level tier management, in accordance with certain embodiments of the present disclosure.

FIG. 2 is a diagram of a system 200 for top level tier management, in accordance with certain embodiments of the present disclosure. System 200 may include a server housing 230, including a server controller 202. In some embodiments, server controller 202 may be a processor or other circuit, servo controller 202 may correspond to host A 102 or host B 108 of FIG. 1, server controller 202 may represent one or more host(s) such as drive interconnect 110 of FIG. 1, server controller 202 may represent a network of attached hosts, or any combination thereof. Server controller 202 may have an interface to connect to a network 232, such as network 114 of FIG. 1, or to other external devices.

System 200 may include a first data storage tier 204, and a second data storage tier 212. Each data storage tier of the system 200 may include one or more data storage devices or mediums. The memories in the first storage tier 204 and the second storage tier 212 may be included in a housing of the server 230. The data storage devices or mediums of the tiered storage system 200 may be separate data storage devices with input/output interfaces to connect to server controller 202, and may be removable or detachable from server 230. In some embodiments, the depicted memories of the storage tiers may be logical volumes in one or more storage devices.

In some embodiments, data storage mediums of a higher tier may provide advantages over storage mediums of a lower tier, such as faster random data access times. In some embodiments, the first tier 204 may include three or more memory devices; for example memory device A 206, memory device B 208, and memory device C 210. While shown grouped together, the memory devices of a given tier are not necessarily included in a single device or unit, or even located at the same geographical location. For example, memory devices of a given tier may be located at different data centers in different locations, and may be accessed by server controller 202 over one or more networks.

In some embodiments, memory devices of the first tier 204 may be grouped with memory devices of the second tier 212 in a single logical storage array. For example, memory device A 206 may be grouped with the storage units 224 in grouping 218. Similarly, memory device B 208 may be grouped with storage unit collection 220, and memory device C 210 may be grouped with storage unit collection 222. Storage units 224 may include data storage devices such as individual hard disc drives, or multiple disc stacks within a single device. Grouping 218 may include a physical grouping, such as memories of a RAID storage array cabinet, or grouping 218 may be logical and storage units 224 may be geographically separated from each other. Other embodiments are also possible.

Rather than a server controller 202 managing a tier addressing map for "dumb" devices and determining which devices or tiers to access, a tier addressing map may be maintained in a device of the top tier 204. A logical storage array including memory device A 206 and storage group 218 may be presented to as a single logical volume to server controller 202, for example through a logical volume manager. The server controller 202 may direct all commands for a given logical volume or logical storage array to a device in the top tier, such as memory device A 206. Memory device A 206 may determine, based on address mapping information stored in memory device A, whether to service the command at the top tier or to redirect the command to the second tier 212. By keeping and managing tier mapping information in the memories of the tiered storage system itself rather than at the server controller 202, the complexity of keeping mirrored storage maps among multiple connected hosts or server controllers can be avoided.

One method of handling top level tier management may include using thin provisioning. Thin provisioning may include presenting a storage device to a host as having more storage capacity than it has in reality. For example, assume memory device A 206 has a storage capacity of X bytes, but is presented to the server controller 202 as having a capacity of Y bytes where X is less than Y (as used herein, X and Y represent positive integers). X may be the user data capacity of memory device A 206, and Y may be the combined usable storage capacity of memory device A 206 and each memory 224 located in memory group 218. Memory device A 206 may maintain an address map for at least the data stored to memory device A, and may include mapping information for memories 224 of the second tier 212. The host may assign a selected range of logical block addresses (LBAs) to memory device A 206 based on the presented total capacity Y. Every data access operation for the assigned LBA range may be directed to memory device A 206. Memory device A 206 may consult the address map to determine whether to service the access operation in the first tier 204, or to redirect to operation to the second tier 212. For example, memory device A 206 may store any data from a write request to a memory first tier 204, and move the data to a lower tier when it becomes cold. For a read operation, memory device A 206 may determine whether the requested data is in the first tier 204, and return it if it is. If the data is not in the address map for the first tier 204, memory device A 206 may send an indication to the server controller 202 to query the second tier 212 for the requested data. For example, memory device A 206 may return a block offset or addressing information for an appropriate memory 224 of second tier 212, which the server controller 202 may use to create and submit a new read request to the second tier 212. In some embodiments, memory device A 206 may divide the range of LBAs assigned to memory device 1 into subranges assigned to the memories 224 of the second tier 212. Accordingly, data misses at the first tier 204 may be directed to a designated memory 224 of the second tier 212 based on the LBA of the requested data. Other embodiments are also possible.

In some embodiments, the server controller 202 may direct operations for the LBA range of 0-10,000 to memory device A 206, LBA range 10,001-20,000 to memory device B 208, and LBA range 20,001-30,000 to memory device C 210. In some embodiments, all data access requests may be directed to a controller or processor of the first tier 204, which may determine which memory device of the first tier to forward the requests. Each memory device of the first tier may then maintain a mapping table for the associated logical storage array.

Figure 3:
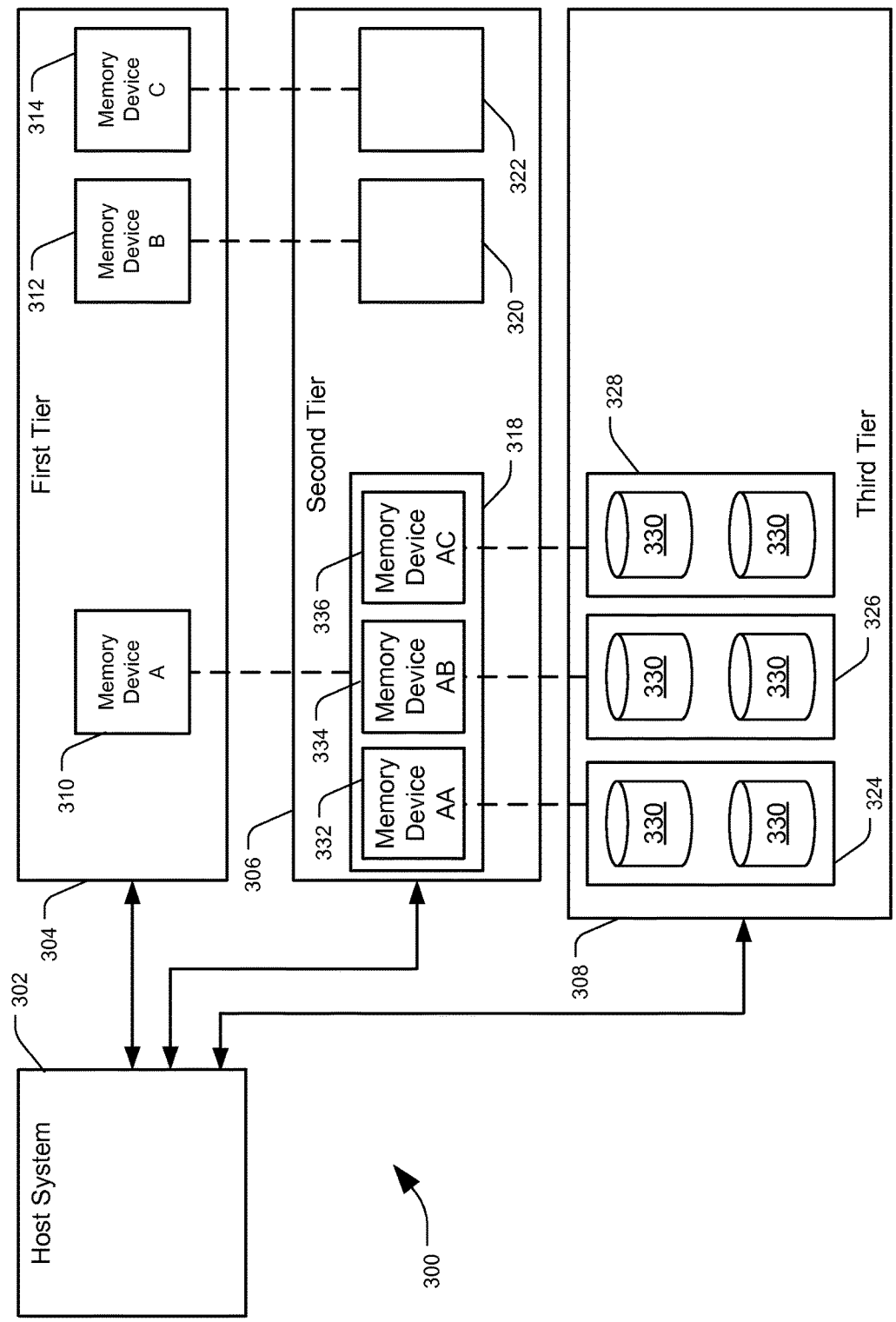
FIG. 3 is a diagram of a system for top level tier management, in accordance with certain embodiments of the present disclosure.

FIG. 3 is a diagram of a system 300 for top level tier management, in accordance with certain embodiments of the present disclosure. System 300 may include a host 302, which may be connected via wired or wireless connections to a tiered storage system including a first tier 304, a second tier 306, and a third tier 308. Memories in each tier may provide a performance advantage over memories of a lower tier. For example, the first tier 304 may include solid state flash memories having fast random access rates, the second tier 306 may include hard disc memories having a slower random access rate, and the third tier 308 may include tape memories having a very slow random access rate. Other embodiments are also possible.

As discussed in regards to FIG. 2, multiple memories from different tiers may be grouped together into logical storage arrays, with a device in the top tier managing or receiving commands for an entire logical storage array. System 300 may include a hierarchal or pyramid system, where a device in each tier manages or receives commands for memories in lower tiers. For example, first tier 304 may include memory device A 310, memory device B 312, and memory device C 314. Each of memory devices A, B, and C may be grouped into different logical storage arrays including memories from the second tier 306 and third tier 308. For example, memory device A 310 may be grouped into a logical storage array with memory group 318 of the second tier 306 and memory groups 324, 326, and 328 of the third tier 308. With thin provisioning, memory device A 310 may be presented to host 302 as including a user storage capacity equal to the total capacities of memory device A 310 and memory groups 318, 324, 326, and 328.

Memory group 318 may include memory device AA 332, memory device AB 334, and memory device AC 336. Each of memory groups 324, 326, and 328 may include one or more memories 330. If a data access request is sent to memory device A 310, and memory device A 310 determines the requested data is not located in a memory of memory device 310, an indication may be returned to query one of memory device AA 332, memory device AB 334, and memory device AC 336 from the second tier 306. In turn, memory device AA 332 may manage commands for memory group 324, memory device AB may manage commands for memory group 326, and memory device AC may manage commands for memory group 328. Accordingly, if a data access miss to the first tier 304 is redirected to memory device AA 332, and memory device A 332 determines the requested data is not located in a memory of memory device AA 332, an indication may be returned to query a memory of the memory group 324 in the third tier 308.

Similarly, memory device B 312 may manage commands for memory group 320 of the second tier, and memory device C 314 may manage commands for memory group 322. In turn, memory devices in groups 320 and 322 may manage commands for memories (not shown) in the third tier 308. In some embodiments, memory devices of the first tier 304 may maintain address mapping information complete enough to return an indication to query a specific tier or a specific memory within a tier, rather than redirecting data requests down one tier at a time. As discussed with regards to FIG. 2, each memory grouping may include a subset of LBAs of the total LBA range for the logical storage array in which the memory grouping is included. For example, if the logical storage array including memory device A 310 is assigned LBA range 1-12,000, memory device AA 332 may be assigned LBA range 1-4,000, memory device AB 334 may be assigned range 4,001-8,000, and memory device AC 336 may be assigned range 8,001-12,000. In turn, each memory of memory group 324 may be assigned a sub-range of the LBA range 1-4,000, and so on for memory groups 326 and 328. Other embodiments are also possible.

Figure 4:
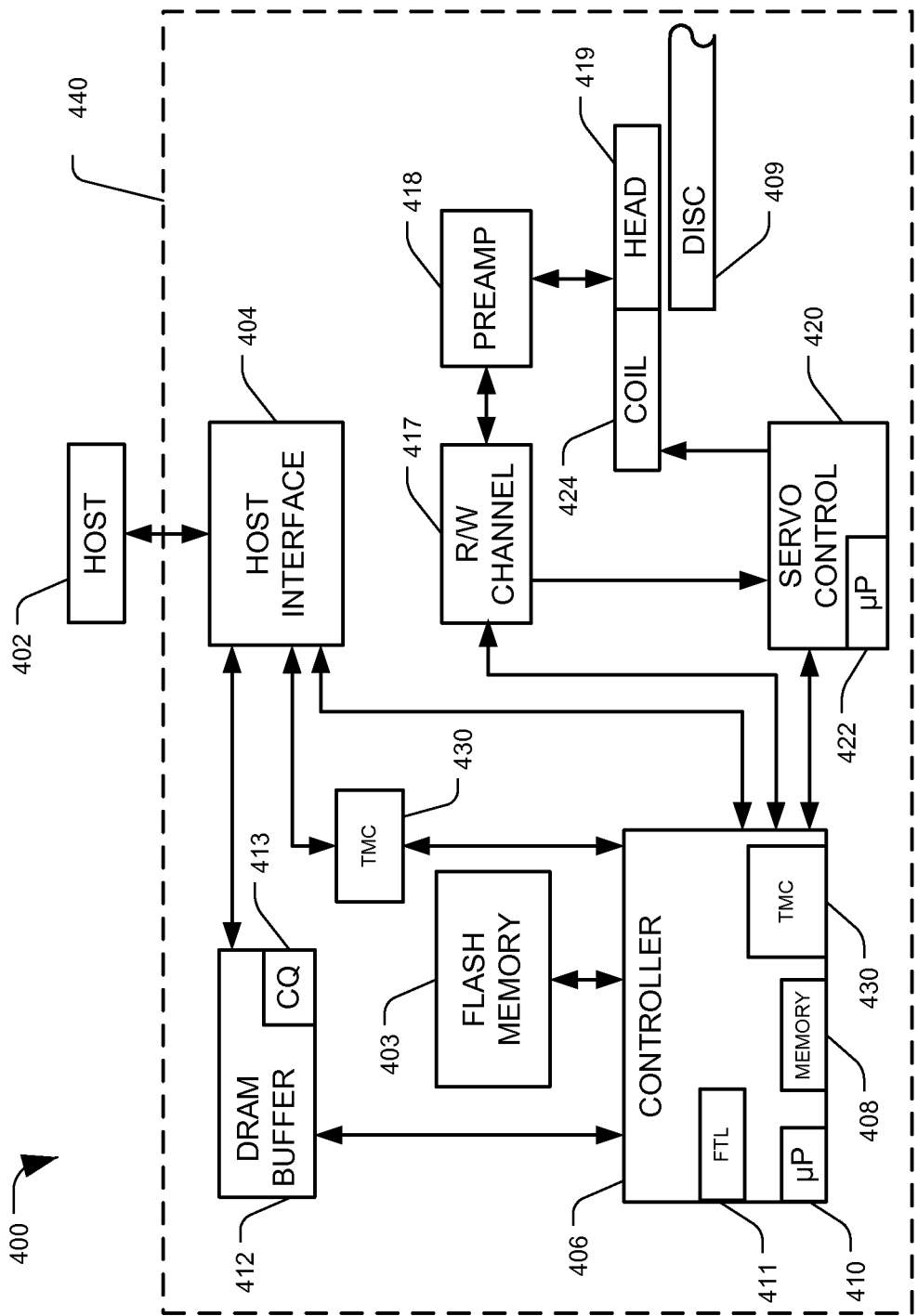
FIG. 4 is a diagram of a system for top level tier management, in accordance with certain embodiments of the present disclosure.

FIG. 4 is a diagram of a system 400 for top level tier management, in accordance with certain embodiments of the present disclosure. Specifically, FIG. 4 provides a functional block diagram of an example data storage device (DSD) 400. The DSD 400 may be a data storage device such as the devices 104 or 106 shown in FIG. 1. For example, DSD 400 may be a storage device incorporated into a given tier of a tiered storage system as discussed herein. In some embodiments, DSD 400 may itself be a tiered storage system having two or more memories configured for tiered storage. The DSD 400 can communicate with a host device 402 (such as the host A 102, host B 108, or both, as shown in FIG. 1) via a hardware or firmware-based interface circuit 404. Host 402 and DSD 400 may be connected locally or over a network, such as network 114 of FIG. 1, and may communicate through the interface 404 over wired or wireless communication. In some embodiments, interface 404 may be used to connect to the network, or DSD 400 may include a network interface (not shown) in addition to the host interface 404. The interface 404 may comprise any interface that allows communication between a host 402 and a DSD 400, either wired or wireless, such as USB, IEEE 1394, Compact Flash, SATA, eSATA, PATA, SCSI, SAS, PCIe, Fibre Channel, Ethernet, or Thunderbolt, among others. The interface 404 may include a connector (not shown) that allows the DSD 400 to be physically removed from the host 402 or intervening network. In some embodiments, the DSD 400 may have a casing 440 housing the components of the DSD 400, or the components of the DSD 400 may be attached to the housing, or a combination thereof. In some embodiments, DSD 400 may be a stand-alone device that does not connect to a host.

The buffer 412 can temporarily store data during read and write operations, and can include a command queue (CQ) 413 where multiple pending operations can be temporarily stored pending execution. Commands arriving over the interface 404 may automatically be received in the CQ 413 or may be stored there by controller 406, interface 404, or another component.

DSD 400 may include one or more main data storage memories. For example, DSD 400 may include a nonvolatile solid state memory, such as flash memory 403, and may be employed as a storage device in a top tier of a tiered storage system. In some embodiments, DSD 400 may include a disc memory 409, and may be used as a second tier memory in a tiered storage system. In some embodiments, DSD 400 may not include one of the solid state memory 403, or the disc 409 and associated components. In some embodiments, DSD 400 may include neither flash memory 403 nor disc 409, and may include another type of storage media. A DSD 400 that includes two or more different types of memories, such as flash memory 403 and disc memory 409, may be referred to as a hybrid drive. In some embodiments, hybrid drives may be configured to use internal tiered storage, such as by using flash memory 403 as a first or top storage tier, and disc memory 409 as a second or lower storage tier. Other embodiments are also possible.

The DSD 400 can include a programmable controller 406, which can include associated memory 408 and processor 410. In some embodiments, the DSD can include a read-write (R/W) channel 417, which can encode data during write operations and reconstruct user data retrieved from a memory, such as disc(s) 409, during read operations. A preamplifier circuit (preamp) 418 can apply write currents to the head(s) 419 and provides pre-amplification of read-back signals. Head(s) 419 may include a read head element and a write head element (not shown). A servo control circuit 420 may use servo data to provide the appropriate current to the coil 424, sometimes called a voice coil motor (VCM), to position the head(s) 419 over a desired area of the disc(s) 409. The controller 406 can communicate with a processor 422 to move the head(s) 419 to the desired locations on the disc(s) 409 during execution of various pending commands in the command queue 413.

DSD 400 may include a flash translation layer (FTL) 411, such as incorporated into or running on controller 406. The FTL may be responsible for logical to physical mapping of data, such as mapping between LBAs of data and flash memory units of the physical storage media. For example, because data stored to a flash may not be overwritten with updated data, updated data may be stored to a new location of the memory and the corresponding LBA of the data may be remapped accordingly. The FTL may also handle wear leveling operations to evenly distribute erase cycles across garbage collection units (GCUs). The FTL may also handle defragmentation operations, bad block management, error correction, or other functionality.

DSD 400 may include a tier map controller (TMC) module 430. The TMC 430 may be a processor, controller, or other circuit, or it may be a set of software instructions that, when executed by a processing device, perform the functions of the TMC 430. In some embodiments, the TMC 430 may be part of the controller 406, executed by the controller 406, or be included in operations performed by the FTL 411. The TMC 430 may control operations of DSD 400 relating to top level tier management, such as those described in relation to FIGS. 7-9. For example, the TMC 430 may maintain an address map for a storage tier including the DSD 400, and may include mapping information for one or more lower tiers as well. The TMC 430 may receive data requests for a logical storage array including the DSD 400 and memories on one or more lower storage tiers. TMC 430 may also monitor data access requests to determine a list of cold data for demotion to lower storage tiers, to determine a list of hot data to promote from lower storage tiers. The TMC 430 may monitor garbage collection units (GCU) of the DSD 400 to determine GCUs scheduled for garbage collection operations, and determine cold data within the GCUs which may be relocated to lower tiers prior to performing the garbage collection operation. Other embodiments are also possible.

Figure 5:
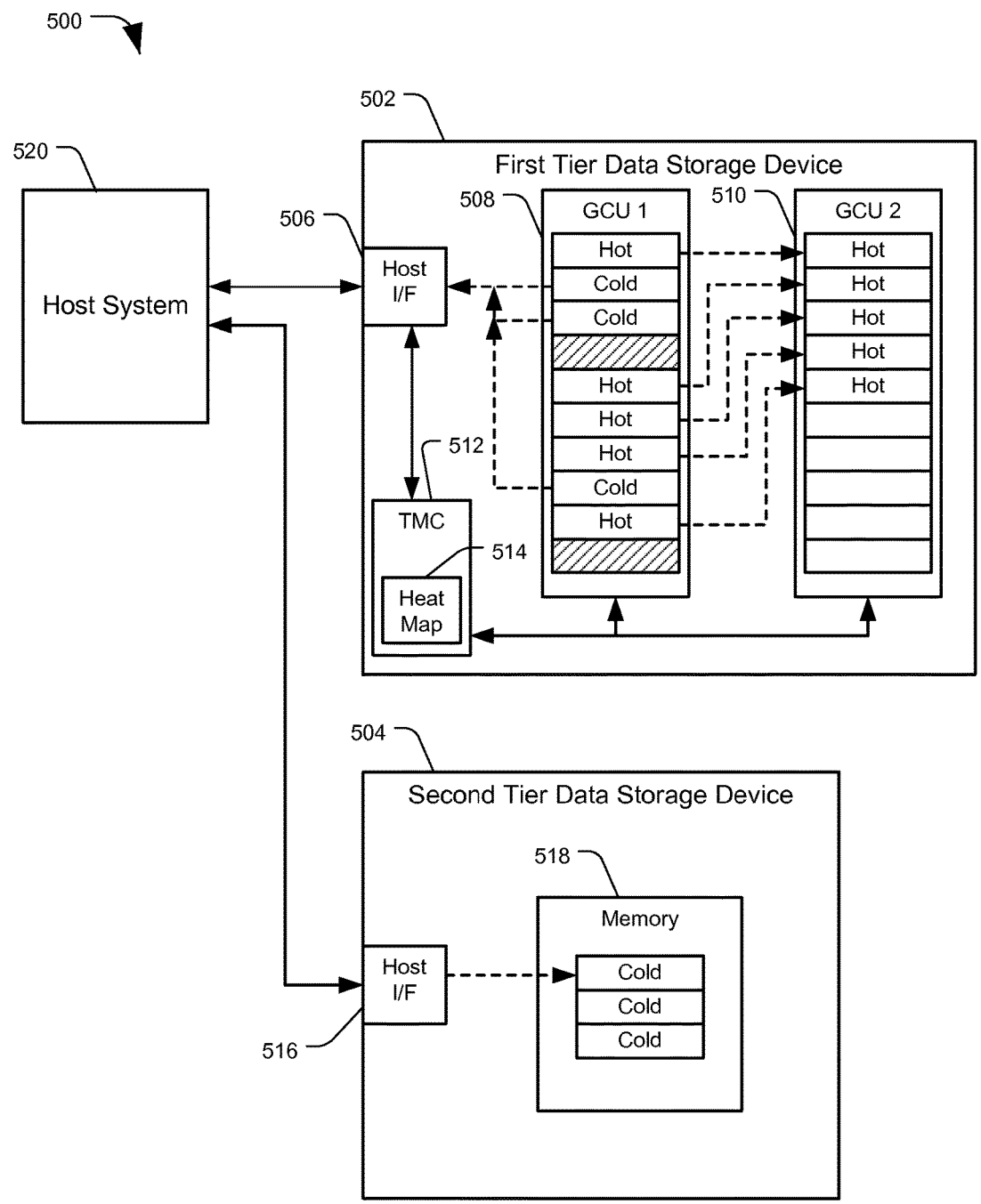
FIG. 5 is a diagram of a system for top level tier management, in accordance with certain embodiments of the present disclosure.

FIG. 5 is a diagram of a system 500 for top level tier management, in accordance with certain embodiments of the present disclosure. In particular, system 500 depicts a process for data migration or demotion between a first storage tier and second storage tier, according to some embodiments. System 500 may include a host system 520, a first tier data storage device (DSD) 502, and a second tier DSD 504. First tier DSD 502 may include a host interface 506, a first memory array garbage collection unit (GCU) 508, a second memory array GCU 510, and a tier map controller 512 where a data heat map 514 may be maintained. Second tier DSD 504 may include a host interface 516, and a memory 518.

In some embodiments, first tier DSD 502 may include a nonvolatile flash memory device, and data may be stored to a collection of flash blocks or pages, such as GCU 1 508 and GCU 2 510. Each GCU may have a set capacity of data units, sometimes called map units, where the map units may be a selected data storage size, such as a byte, 4 KB, or another size. In some embodiments, data may be read from a GCU in a random access fashion, but data may only be deleted from a GCU by deleting all data from the GCU. In order to recover storage space of the first DSD 502 occupied by invalid data (e.g. data that has been made invalid due to a new version of the data, data which has been marked as deleted, etc.), the DSD 502 may perform a defragmentation or "garbage collection" operation. Garbage collection may include reading all valid data from a GCU, and storing the valid data to a different GCU. In some embodiments, GCUs can include other types or areas of memory than flash block, such as bands of shingled recording tracks on a disc memory.

Some types of solid state memory have a finite number of program-erase cycles before the memory begins to deteriorate. Accordingly, it may be advantageous to minimize write amplification by not writing data when it can be avoided. One method to reduce write amplification is to not copy cold data during a garbage collection operation, and instead move the data to a lower data storage tier.

An example method of data migration may include maintaining a heat map for data stored to one or more storage devices of a tiered storage system. A heat map may include a log of a quantity or frequency of data accesses to data files, map units, or other data "chunks" on the memory. Frequently accessed data may be considered "hot," while infrequently accessed data may be considered "cold." It may be advantageous to maintain hot data on higher storage tiers with rapid data access rates in order to quickly respond to host requests for commonly accessed data. In order to maximize an amount of hot data available on higher tiers, cold data may be moved to a lower tier.

In some embodiments, the TMC 512 of the first tier DSD 502 may maintain a heat map 514 for data stored to the first tier DSD 502. When data access requests are received at the first tier DSD 502 over the host interface 506, the TMC may update the heat map 514 for the corresponding data. In some embodiments, the TMC 512 may only maintain a heat map for data stored to the first tier, and requests for data on a lower tier will not result in an update to the heat map 514. In such embodiments, a device on the lower tier may maintain a local heat map for that tier. Other embodiments are also possible.

In the embodiment of system 500, GCUs of the first tier DSD 502 may have a capacity of ten map units. Each data in each map unit may be classified as hot data, cold data, invalid data (represented by hashed lines), or empty. GCU 1 508 may be completely full, and may include a number of map units occupied by invalid data. The first tier DSD 502 may schedule a garbage collection operation for GCU 1 508 to regain space occupied by the invalid data. Prior to performing the garbage collection, the TMC 512 may determine whether GCU 1 508 includes any cold data, for example by consulting heat map 514. GCU 1 508 may be determined to include three map units of cold data. The TMC 512 may notify the host system 520 of the cold data via the host interface 506. For example, the host 520 may periodically query the first tier DSD 502 for information on cold data contained in GCUs scheduled for garbage collection, and the first tier DSD 502 may respond with an indication of the corresponding cold data.

After being notified of the cold data, the host 520 may issue one or more read requests to the first tier DSD 502 for the indicated cold data. The cold data may be read and a copy returned to the host 520. Data movement may be indicated by dashed lines, such as the lines from the cold data in GCU 1 508 to the host interface 506. In some embodiments, the first tier DSD 502 may also provide the host 520 with an address, block offset, or other information directing the host 520 to store the cold data to the second tier DSD 504, or a specific memory of the second tier. The indication of where to send the cold data may be provided to the host 520 as part of the initial indicator regarding the cold data, or returned in response to the read request.

After receiving the cold data from the first tier DSD 502, the host 520 may issue a write command to the second tier DSD 504 to store the cold data. The second tier DSD 504 may then store the cold data to memory 518 and return an indication that the data has been stored. The host 520 may then issue an indicator to the first tier DSD 502 that the cold data has been securely stored to a lower tier. For example, host 520 may issue a TRIM or UNMAP command for the cold data, indicating it can be safely erased. The first tier DSD 502 may then update address maps, heat maps, or other internal data trackers to designate the cold data in GCU 1 508 as invalid. If the indicator was received from the host 520 prior to performing garbage collection on GCU 1 508, then the cold data will not be copied during the garbage collection. If the indicator is not received prior to performing the garbage collection, the cold data may be marked as invalid in whichever GCU(s) the cold data was stored after garbage collection.

Provided the cold data in GCU 1 508 was marked as invalid prior to performing garbage collection, the first tier DSD 502 may then perform garbage collection and only retain the hot data from GCU 1 508. The five hot data map units may be copied from GCU 1 508 to an empty GCU 2 510. All of the data in GCU 1 can now be safely deleted.

In some embodiments, all write operations for the tiered storage system 500 may be received at the first tier DSD 502. The first tier DSD 502 may store all data for data writes to memories of the first tier, and demote data to lower tiers as it becomes cold. In such embodiments, it may not matter that an older copy of the data is already stored on a lower tier. Since all read requests will go through the top tier, only the most recent version of the data will be returned in response to a read command. If the data becomes cold and is moved to the lower tier, the old version of the data in the top tier may then be overwritten or marked as invalid. In some embodiments, the first tier DSD 502 may maintain address maps for lower tiers as well. When receiving a write command, the TMC 512 may consult the heat map 514 for the data. If the write command will not render the data "hot" (e.g. raise it above some threshold of number or frequency of data accesses), the first tier may return an indication that the write request should be submitted to a lower tier containing the existing copy of the cold data. Other embodiments are also possible.

Figure 6:
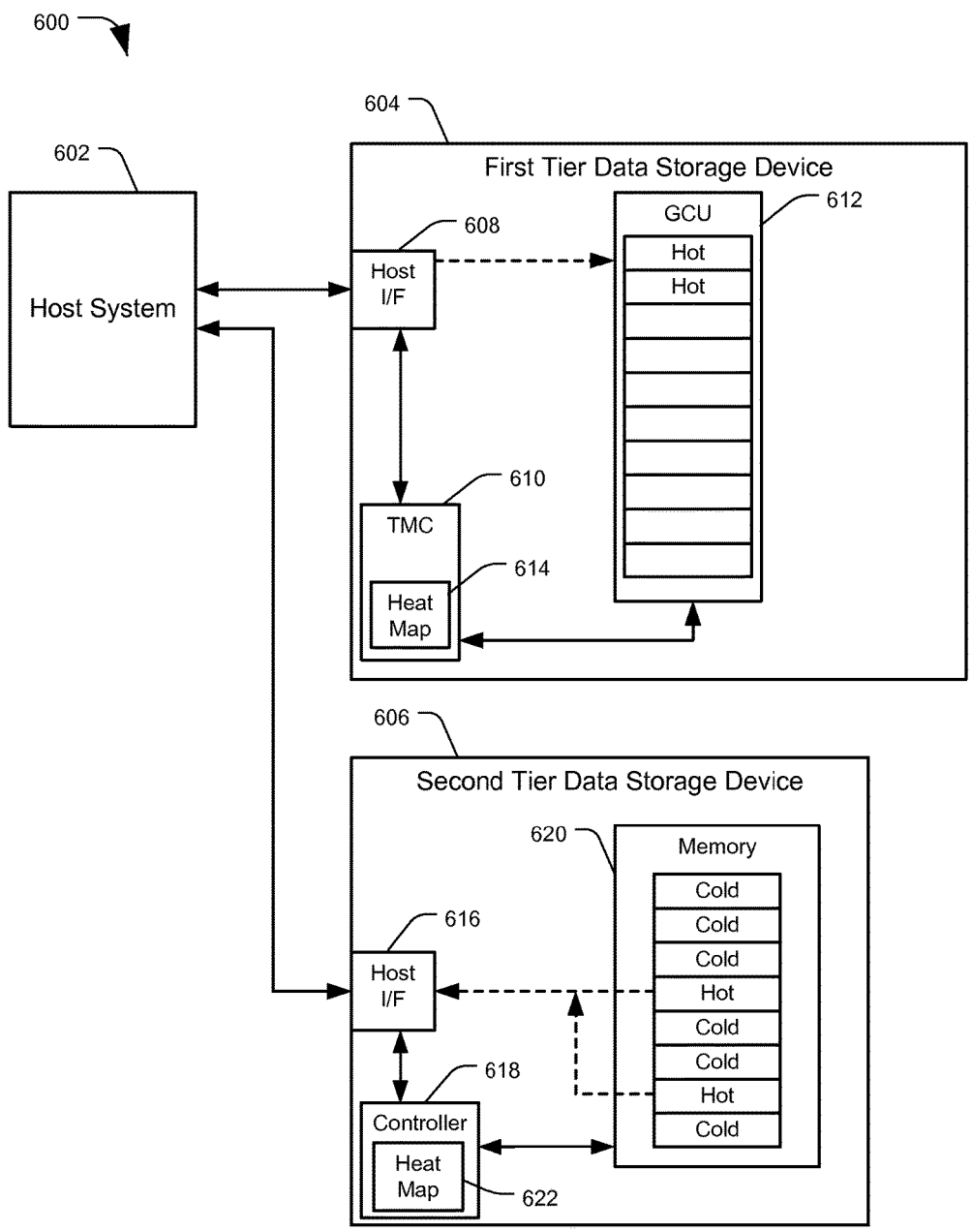
FIG. 6 is a diagram of a system for top level tier management, in accordance with certain embodiments of the present disclosure.

FIG. 6 is a diagram of a system 600 for top level tier management, in accordance with certain embodiments of the present disclosure. In particular, system 600 depicts a process for data migration, or promotion from a second storage tier to a first storage tier, according to some embodiments. System 600 may include one or more host system(s) 602, a first tier data storage device (DSD) 604, and second tier DSD 606. The first tier DSD 604 may include a host interface 608, a flash memory GCU 612 or other memory, and a tier map controller (TMC) 610. The TMC 610 may maintain a heat map 614, such as for first tier DSD 604, second tier DSD 606, or both. The second tier DSD 606 may include a host interface 616, a memory 620, and a controller 618. In some embodiments, controller 618 may maintain a heat map 622, for example regarding data stored in memory 620.

In some embodiments, a device of system 600 may monitor data accesses for data stored in the second tier DSD 606 to determine hot data. Hot data may be data that has exceeded a threshold of number of accesses, a threshold average access rate, or some other access metric. Data accesses may be monitored using a heat map, which in some embodiments may be incorporated into an address map. For example, an address map may map an LBA of data received from a host to a physical address (e.g. physical block address (PBA), cylinder-head-sector (CHS) information, or other physical mapping location) of a data storage medium where the data is stored. The address map may further include information on data accesses to the LBA to determine hot or cold data.

In some embodiments, the TMC 610 of the first tier DSD 604 may maintain a heat map for data stored on the second tier DSD 606. For example, every data access request for a tiered storage system may be initially sent to the first tier DSD 604, which may maintain a heat map based on the requests. In some embodiments, the first tier DSD 604 may only maintain a heat map or address map for data stored to the first tier DSD 604, and may not maintain a heat map for lower tiers. The second tier DSD 606 may maintain a heat map 622 of data stored to the second tier, instead of or in addition to heat map 614 maintained in the first tier DSD 604.

In some embodiments, the first tier DSD 604 may determine that hot data is residing in the second tier DSD 606. The first tier may send a notification to host 602 to issue a read request to the second tier for the hot data, for example by providing a block offset or address for the data. The host 602 may send a read request to the second tier DSD 606, which may be received at host interface 616. The data may be retrieved from memory 620 using controller 618, and returned to host 602. The host 602 may then send a write request to first tier DSD 604 containing the hot data, which may then be stored to free map units of the flash GCU 612. In some embodiments, a notification that the data has been stored may be returned to the host 602, and the second tier DSD 606 may be notified and the local copy of the hot data marked as invalid.

In some embodiments, the second tier DSD 606 may maintain heat map 622 and determine that hot data is residing in memory 620. Second tier DSD 606 may issue a notification to host 602 via host interface 616 identifying the hot data. Host 602 may then issue a read request for the hot data to second tier DSD 606, and then submit a write request to first tier DSD 604. After receiving confirmation that the hot data has been stored to the first tier DSD 604, the host may send a notification to the second tier DSD 606 to mark the local copy of the hot data as invalid. In some embodiments, the host 602 may periodically issue queries to the second tier DSD 606 requesting information on hot data, rather than the second tier DSD 606 issuing notifications autonomously.

Embodiments where the heat map for the second tier is maintained in the first tier may allow for simplified storage architecture, as the lower tier may not need to maintain a separate heat map, issue notices of hot data, or to be aware of whether data stored on the second tier is current valid data. Embodiments where a separate heat map is stored in the second tier may avoid the need for the first tier to store address map or heat map information for lower tiers, freeing up memory in the first tier. Other embodiments are also possible.

In some embodiments, similar processes may be performed to demote data. For example, the second tier DSD 606 may send an indication to host 602 when data is determined to be cold for the second tier, and should be demoted to a third tier (not shown). In some embodiments, the host 602 may periodically query the second tier DSD 606 regarding cold data which may be demoted. In some embodiments, the first tier DSD 604 may maintain heat maps for multiple tiers, and may indicate that data stored on the second tier should be moved to a third tier. Other embodiments are also possible.

Figure 7:
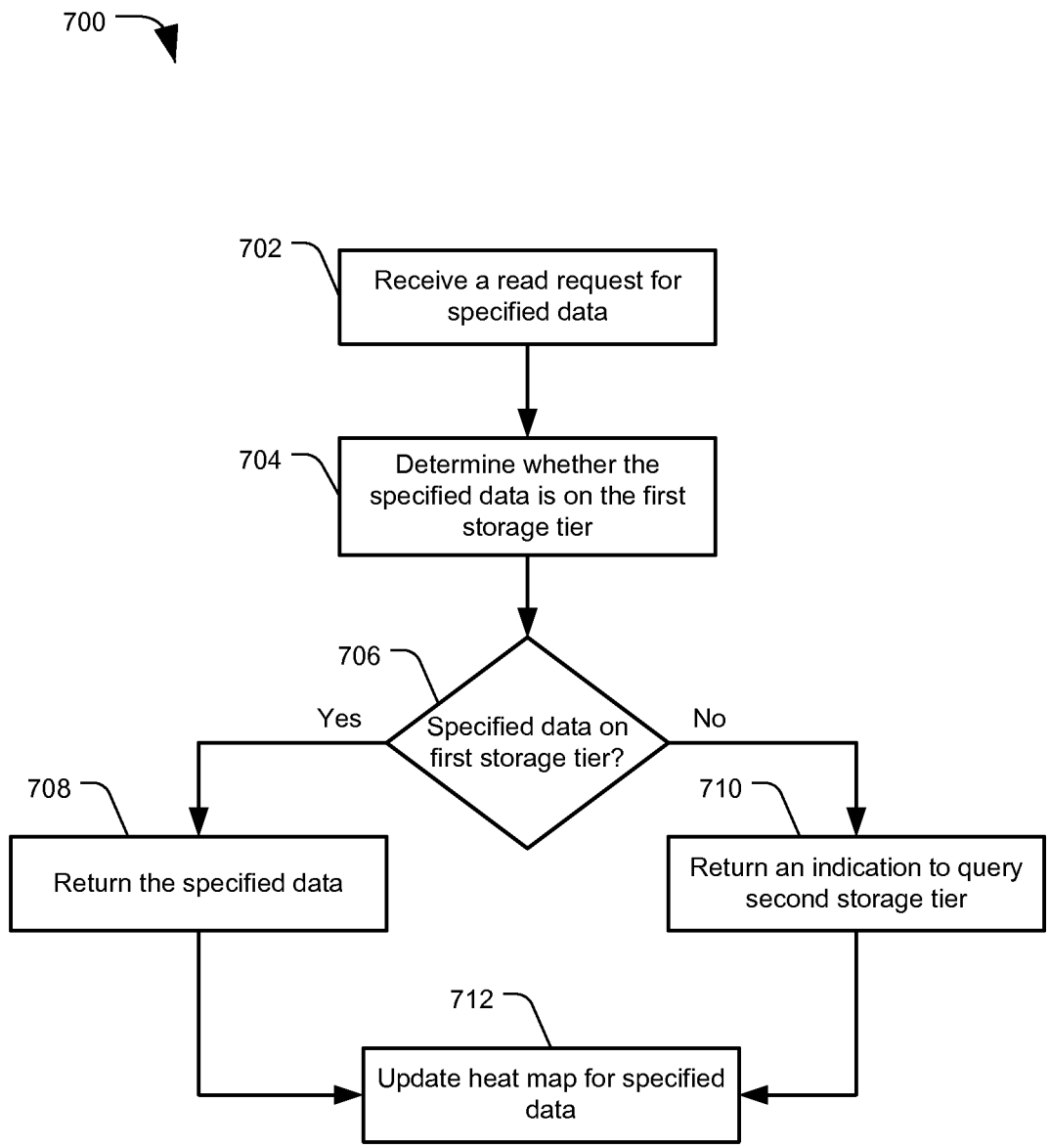
FIG. 7 is a flowchart of a method for top level tier management, in accordance with certain embodiments of the present disclosure.

FIG. 7 is a flowchart of a method 700 for top level tier management, in accordance with certain embodiments of the present disclosure. Method 700 may include receiving a read request for specified data, at 702. In some embodiments, the request may be received from a host computer at a storage device of a top or first tier of a tiered storage system. The method 700 may include determining whether the specified data is located on the first storage tier of the tiered storage system. For example, the data storage device (DSD) receiving the read request may consult an address map to determine whether the specified data is stored to a memory of the DSD.

If the specified data is on the first storage tier, at 706, the method may include returning the specified data to the requesting device, at 708. If the specified data is not located on the first storage tier, at 706, the method may include returning an indication to query a second storage tier, at 710. For example, if addressing information for the second storage tier is maintained in the first storage tier, the indication may provide specific addressing information for the requested data on the second storage tier. If addressing information for the second storage tier is not maintained in the first storage tier, the indication may provide a block offset or addressing information for a storage device on the second storage tier. The indication may also include instructions or a notice to re-issue the read request for the specified data to the second storage tier.

After returning the specified data, at 708, or an indication to query the second storage tier, at 710, the method 700 may include updating a heat map for the specified data, at 712. In some embodiments, a heat map may only be maintained in the first storage tier for data located in the first storage tier. For example, a heat map may only be updated if the specified data was found and returned, at 708. In some embodiments, a heat map may be maintained in the first storage tier for data of the second storage tier, and the heat map may be updated even when the indication to query the lower tier is returned, at 710. Other embodiments are also possible.

Figure 8:
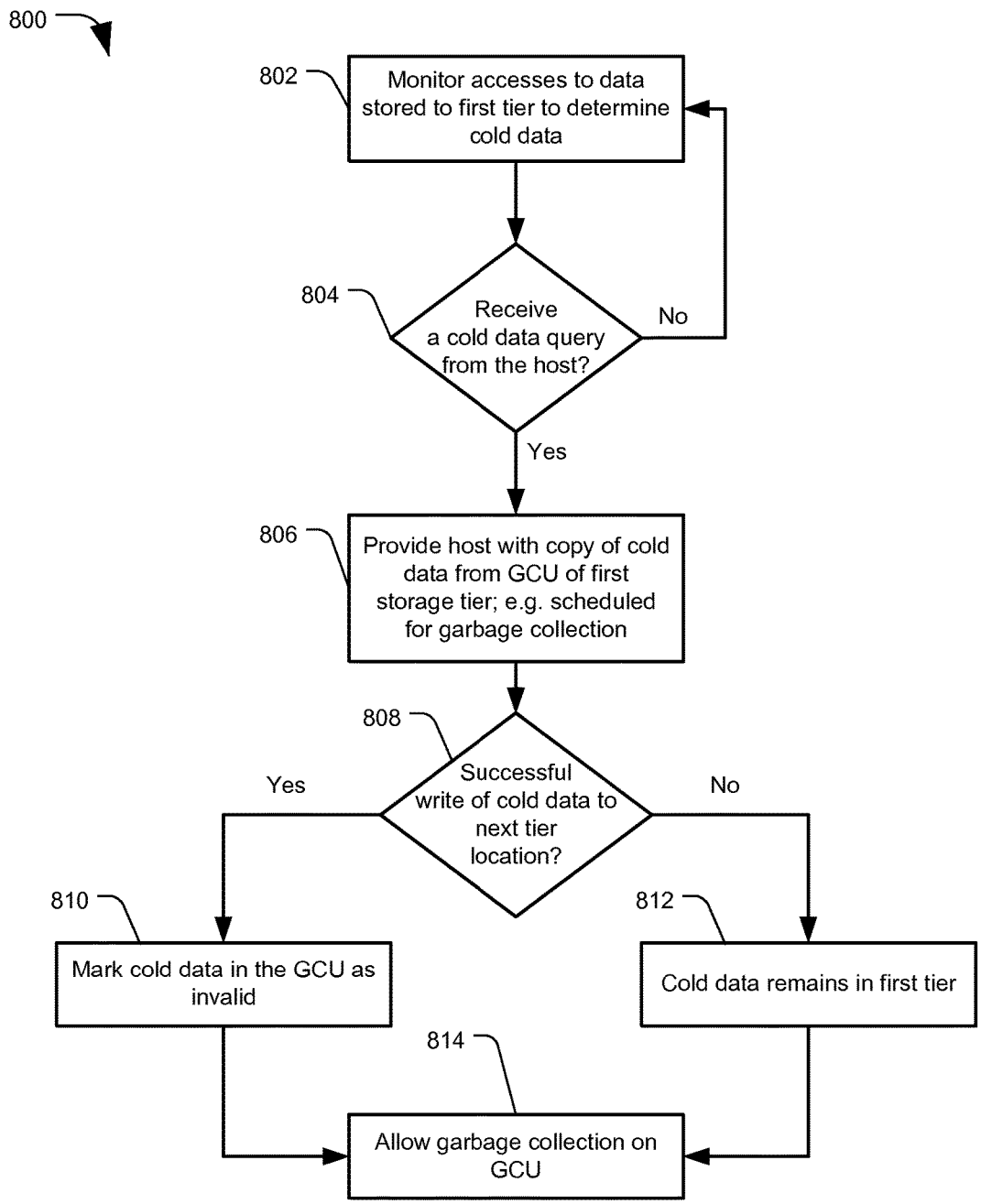
FIG. 8 is a flowchart of a method for top level tier management, in accordance with certain embodiments of the present disclosure.

FIG. 8 is a flowchart of a method 800 for top level tier management, in accordance with certain embodiments of the present disclosure. Method 800 may be performed by a DSD in a first or top tier of a tiered storage system, for example. The method 800 may include monitoring accesses to data stored to a first storage tier to determine infrequently accessed cold data, at 802. In some embodiments, a DSD may maintain a heat map of data access statistics, and may determine cold data based on the frequency or recency of data accesses. For example, if an LBA has not received an access request in a specified period of time or specified number of received access requests, the LBA and associated data may be considered "cold." Similarly, if the LBA has not maintained a threshold amount of data access requests per unit time or per a specified number of total received access requests at the first tier, the data may be considered cold. Other embodiments are also possible, or any combination thereof.

Method 800 may include determining all cold data in a first tier, all cold data in a specific device or memory of a first tier, or a subset of cold data from one or all first tier memories. In some embodiments, the method 800 may include only determining cold data stored to garbage collection units (GCUs) of the first tier scheduled for garbage collection operations. For example, a GCU may be flagged for garbage collection if it contains a threshold number of invalid sectors, or a highest number of invalid sectors among occupied GCUs, or based on some other criteria. A determination may be made as to whether a given GCU has met the criteria for garbage collection, or is approaching the criteria. Other embodiments are also possible.

Method 800 may include monitoring for a cold data query from a host device, at 804. For example, a host may issue a query regarding cold data to the first tier DSD at designated time intervals, after a selected number of data access commands, or in response to a notice from the first tier DSD regarding existing cold data. The query may include a request for information regarding cold data, or it may be a read request for the cold data itself. For example, the host may query whether there is cold data to be moved, the DSD may respond with information identifying cold data to be moved, and the host may issue a read request for the identified cold data. Other embodiments are also possible. In some embodiments, determining the cold data may be performed after or in response to receiving a cold data query; e.g. 804 and 802 may be swapped in order.

If no cold data query has been received, at 804, the DSD may resume monitoring data accesses at 802. If a cold data query has been received, at 804, the first tier DSD may provide the host with a copy of cold data from GCUs of the first storage tier, at 806, for example by providing data from GCUs scheduled for garbage collection. The first tier DSD may optionally provide the host with an address or location of where the cold data is to be stored in the lower tier. In some examples, the host may issue a read request at 804, and the DSD may respond with the cold data corresponding to the read request at 806. In some embodiments, the host may query as to whether cold data exists which should be moved, at 804, and the DSD may return the cold data to be moved at 806, without receiving a specific read request identifying the data. Other embodiments are also possible.

The method 800 may include determining whether a copy of the cold data provided at 806 has been successfully stored to a location in the next tier, at 808. For example, a host device may issue a write command to a lower storage tier for the cold data, and then provide a notification to the top tier DSD that the cold data has been successfully stored to another memory. This may allow the top tier DSD to delete or overwrite the cold data without loss of information. If the DSD has determined that a copy of the cold data has been successfully stored to another memory, at 808, the method may include marking the version of the cold data in the top tier GCU as invalid, at 810. For example, a flash memory may mark the cold data as "stored in the next tier" in the flash translation layer (FTL), along with an associated address. In some embodiments, the first tier may not maintain information on where data is stored in lower tiers, or if the data is stored in the tiered storage system at all.

If a determination has not been made that a copy of the cold data has been stored to another memory, at 808, the method may include not marking the cold data in the GCU as invalid, at 812, and retaining the cold data in the first tier. For example, a determination may not be made that the data was stored to the next tier if the DSD begins performing a garbage collection operation on the GCU with the cold data before the host has returned an indication that the data was successfully stored elsewhere. In some embodiments, a garbage collection operation may be suspended until a response has been received. For example, after providing data in response to a cold data query, garbage collection on all GCUs, or all GCUs containing cold data, may be suspended until a confirmation of data relocation has been received.

The method 800 may include performing a garbage collection operation, at 814. If the cold data was marked at invalid at 810, the garbage collection operation may not include copying the cold data to a new GCU, and the copy of the cold data may be erased when the GCU is erased. If the cold data was not marked as invalid, at 812, the garbage collection operation may include copying the cold data out of the GCU, and not erasing the cold data when the GCU is cleared. If an indication is then received from the host that a copy of the cold data has been stored to another memory, the cold data that was copied in the garbage collection operation may be marked as invalid. In some embodiments, defragmentation operations may occur independently of cold data migration operations, and may not be triggered or operate based on cold data queries or cold data transfers. In some operations, garbage collection may be performed after or based on cold data transfer operations, for example to increase the likelihood that cold data is not copied during defragmentation. Other options are also possible.

Figure 9:
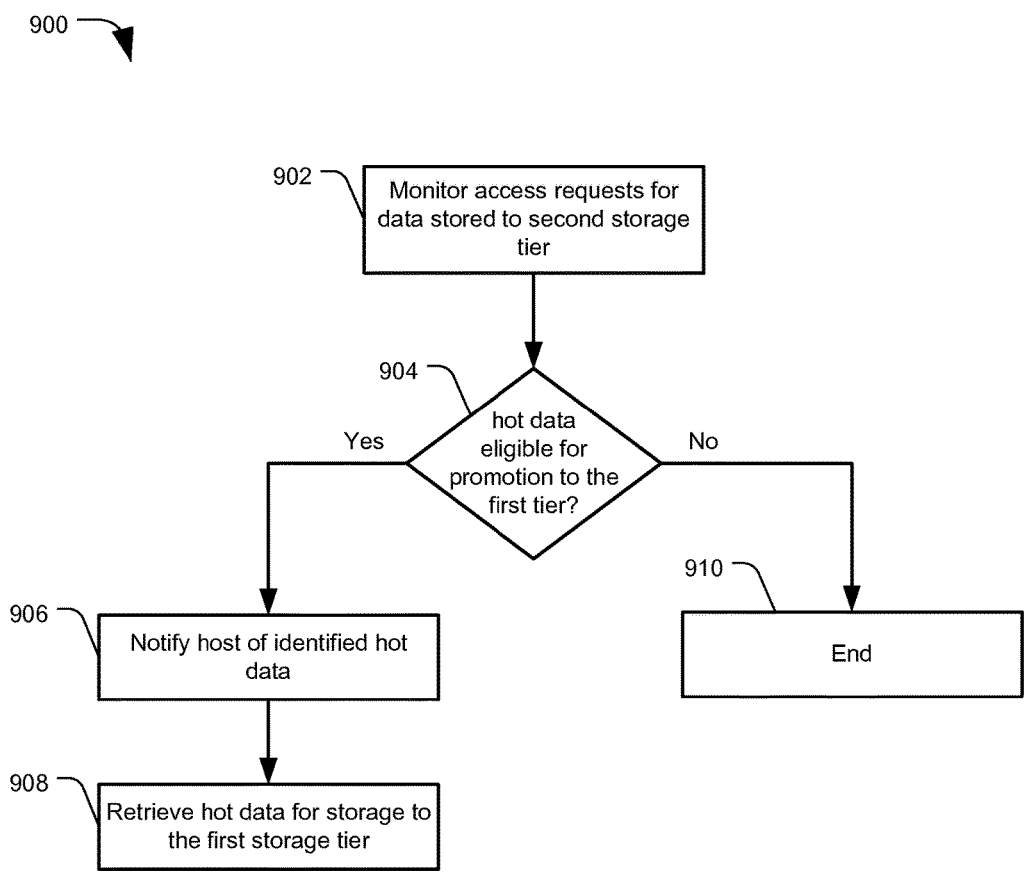
FIG. 9 is a flowchart of a method for top level tier management, in accordance with certain embodiments of the present disclosure.

FIG. 9 is a flowchart of a method 900 for top level tier management, in accordance with certain embodiments of the present disclosure. Method 900 may be performed by a data storage device on a first tier or a second tier of a tiered storage system. For example, if a DSD on the first tier maintains a heat map for data on a second tier, the first tier DSD may perform method 900. Alternately, a second tier DSD may maintain a heat map for data stored in the second tier. Other embodiments are also possible.

The method 900 may include monitoring access requests for data stored to a second storage tier, at 902, for example by maintaining a heat map for the data. A determination may be made whether the second tier contains hot data (e.g. frequently accessed data) eligible for promotion from the second tier to the first tier, at 904. In some embodiments, the determination may be made in response to a query from a host device regarding hot data. If no hot data is found, at 904, the method may end, at 910. In some embodiments, this may include responding to a query from the host with an indication that no hot data is to be moved.

If the second tier does contain hot data, at 904, the method may include notifying a host of identified hot data, at 906. The method 900 may then include retrieving the hot data for storage to the first storage tier, at 908. For example, if method 900 is performed by a second tier DSD, the DSD may retrieve the hot data from a memory of the second tier and return the hot data to the host, which may in turn issue a write command for the hot data to a first tier DSD. If method 900 is performed by a first tier DSD, 908 may include receiving a write command from the host to store the hot data which has been read from the second tier DSD. Other embodiments are also possible.

FIGS. 10A, 10B, 10C, and 10D are diagrams of systems for top level tier management, in accordance with certain embodiments of the present disclosure. FIGS. 10A, 10B, 10C, and 10D may depict a series of numbered steps for data access operations and cold and hot data migration within tiered storage systems.

Figure 10A:
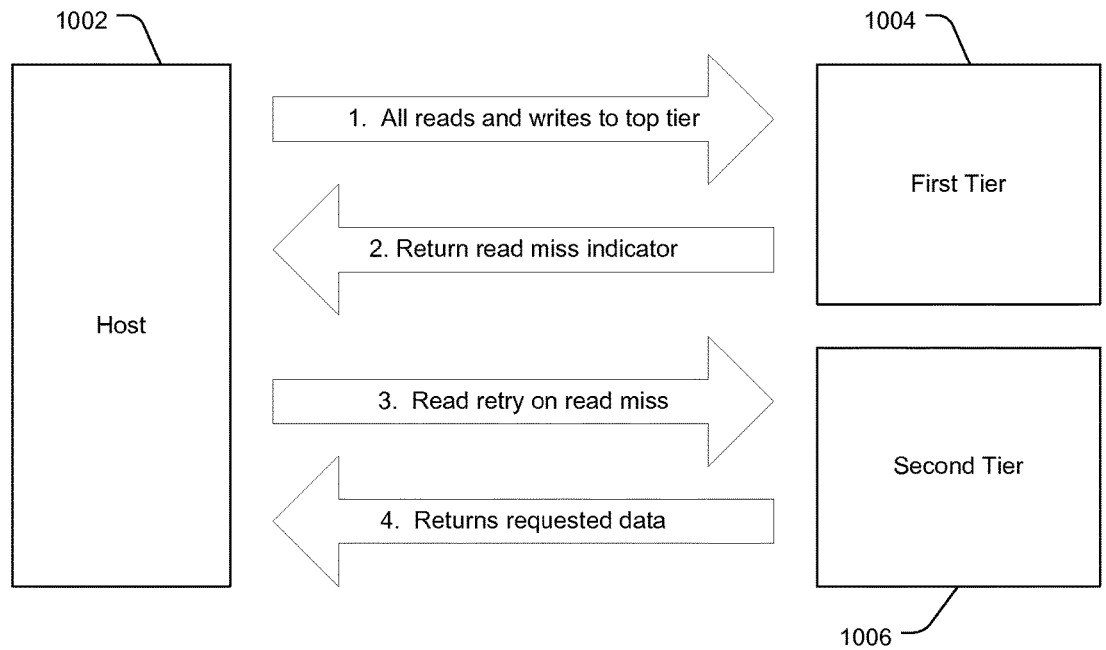
FIGS. 10A, 10B, 10C, and 10D are diagrams of systems for top level tier management, in accordance with certain embodiments of the present disclosure.

In FIG. 10A, host system(s) 1002 may (1) issue all read and write operations to the first or top tier 1004. The first tier 1004 may store data from write requests to the first tier 1004, or retrieve data stored to the first tier 1004 in response to read requests. A read miss (2) may result in the first tier 1004 returning to the host 1002 an indication that that requested data is not stored to the first tier 1004, and to query a lower tier for the requested data. For example, the indication may include a location, address, or identifier of the lower tier or the requested data, or the indication may be an instruction to query the lower tier and the host 1002 can determine the lower tier location based on information in a logical volume manager. Host 1002 may (3) issue a read retry to the second tier 1006 after a read miss to the first tier 1004. The second tier 1006 may (4) return the requested data to the host 1002.

Figure 10B:
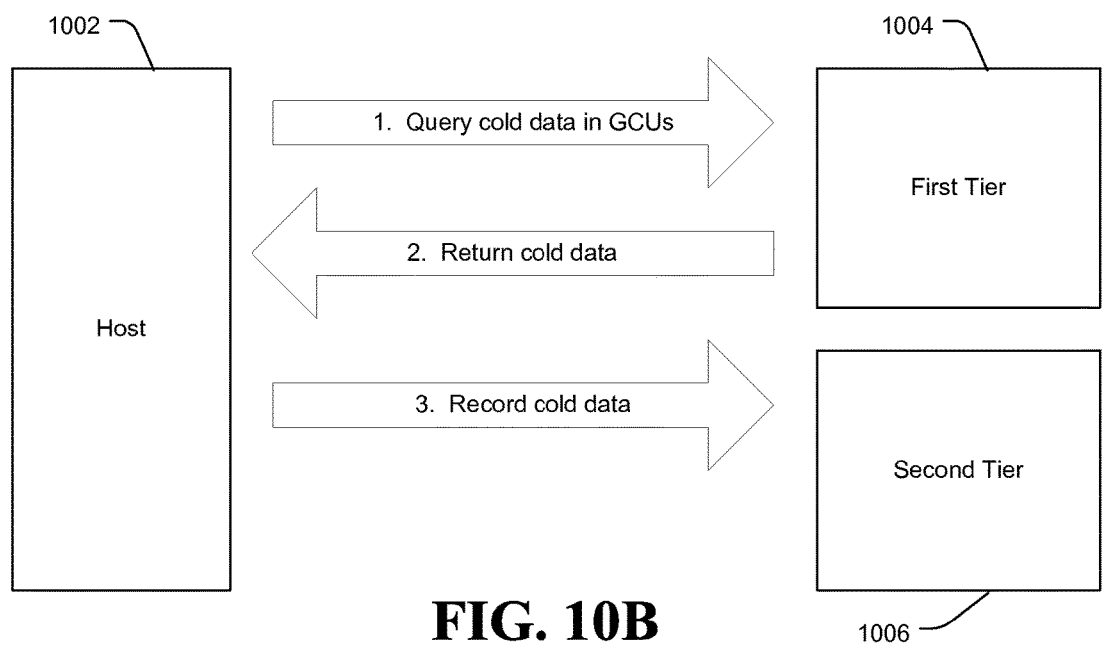

Turning to FIG. 10B, host 1002 may (1) query the first tier 1004 for cold data located in garbage collection units (GCUs) of the first tier 1004, such as flash blocks scheduled for garbage collection. The host 1002 may issue queries on cold data at set time intervals, after a selected number of data access operations, in response to an indication from the first tier 1004, based on other criteria, or any combination thereof. The first tier 1004 may (2) return cold data to the host 1002, and may also return a second tier address for storing the data. For example, one or more queries from the host 1002 may comprise read requests for any cold data or specified cold data, and the first tier 1004 may return the data in response to the read request(s). The host 1002 may (3) record the cold data received from the first tier 1004 to the second tier 1006. For example, host 1002 may issue one or more write requests including the cold data to the second tier 1006. In some embodiments, the host 1002 may receive an indication from the second tier 1006 that the cold data has been stored, and may notify the first tier 1004 that the cold data is stored to the second tier 1006 and can be removed from the first tier 1004.

Figure 10C:
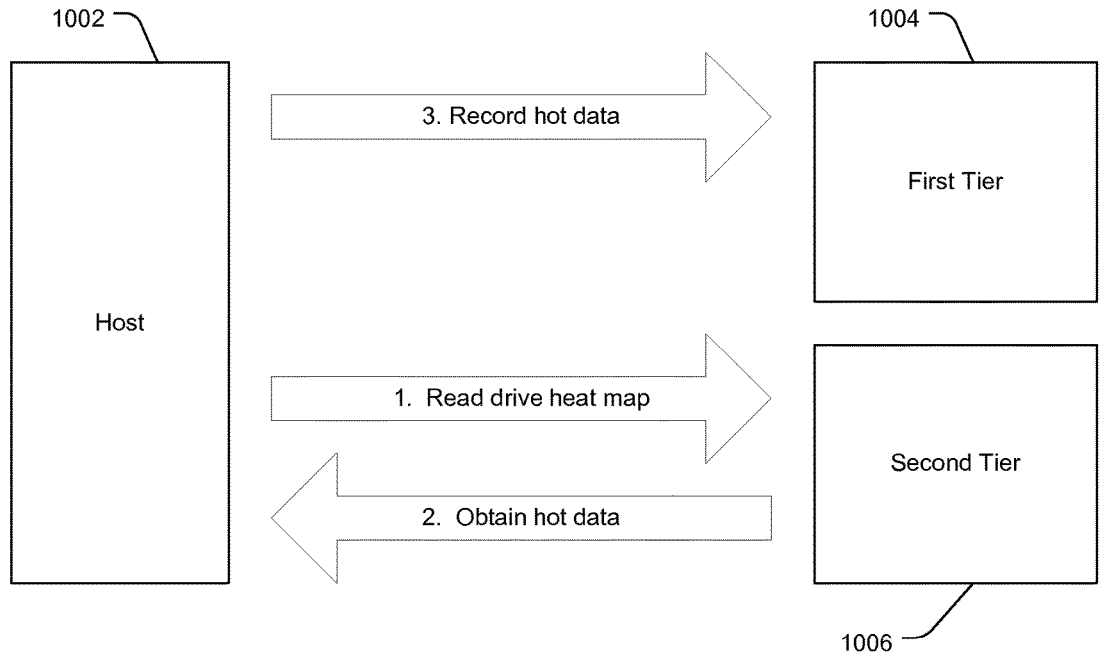

Turning to FIG. 10C, host 1002 may (1) read a heat map for data on a drive of the second tier 1006. In some embodiments, the host 1002 may access the heat map data to determine potential hot data. In some embodiments, the host 1002 may query the second tier 1006 about hot data, and a device of the second tier may determine whether there is hot data based on a heat map. Other embodiments are also possible. The second tier 1006 may (2) obtain hot data from the second tier and return it to the host 1002. Host 1002 may (3) record the retrieved hot data to the first tier 1004, so that the hot data may be accessed more quickly on future access operations.

Figure 10D:
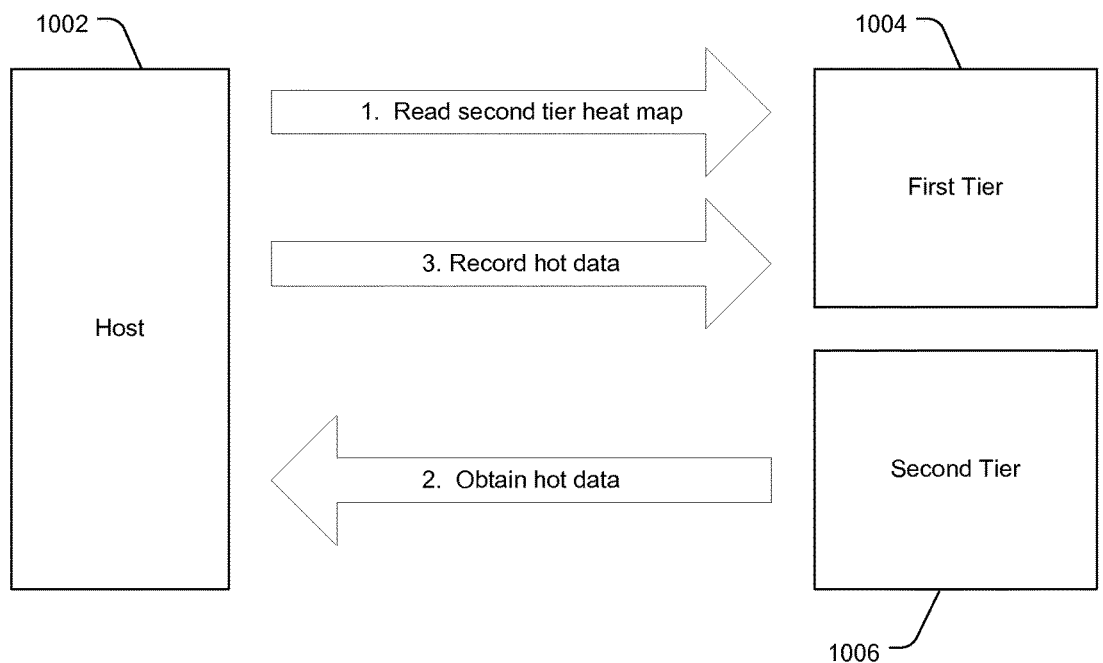

FIG. 10D illustrates another process for migrating hot data to the first tier 1004, according to certain embodiments, Host 1002 may (1) read a heat map for the second tier from the first tier, at 1004. For example, if the first tier 1004 maintains a heat map for data stored to the second tier 1006, a determination of hot data in the second tier 1006 may be made based on the information in the first tier 1004. Once again, the host 1002 may retrieve the heat map information from the first tier 1004, or may query the first tier 1004 about hot data and receive information regarding any hot data in return. The host 1002 may (2) obtain the hot data from the second tier 1004, for example by issuing a read request for specified data. The host 1002 may then (3) record the hot data to the first tier 1004, for example by issuing a write request.

In some embodiments, hot data eligible for promotion may be determined at other points. For example, when the first tier 1004 receives a read request resulting in a read miss, the first tier 1004 may determine that the requested data is hot data located on the second tier. The first tier 1004 may return an indication to query the second tier 1006, and may also identify the requested data as hot data. After the host 1002 obtains the data from the second tier 1006, the host 1002 may also issue a write operation to the first tier 1004 to store a copy of the hot data.

In some embodiments, after receiving a read miss indication from the first tier 1004, the host 1002 may issue a read request to the second tier 1006. The second tier 1006 may identify the requested data as hot data based on a local heat map. The second tier 1006 may return the requested data, along with an indication that the data is hot data. The host 1002 may then issue a write request to the first tier 1004 to store a copy of the hot data. Other embodiments are also possible.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a circuit including a controller of a data storage device of a first storage tier, the circuit configured to:
receive data access requests from a plurality of host devices for a tiered storage system including the first storage tier;
maintain a first address map for the first storage tier having a first type of storage medium;
receive a read request for specified data from a selected one of the plurality of host devices;
return the specified data when the data exists on the first storage tier; and
return an indication to query a second storage tier having a second type of storage medium when the specified data does not exist on the first storage tier.

2. The apparatus of claim 1 comprising the circuit further configured to:
determine infrequently accessed data stored to the first tier based on a log of data accesses;
provide, to a host device, a copy of the infrequently accessed data stored in a selected area of the first storage tier that is near to a trigger for performing a defragmentation operation; and
perform the defragmentation operation, including copying valid data from the selected area to an available area of the first storage tier, the valid data not including the infrequently accessed data.

3. The apparatus of claim 2 comprising the circuit further configured to:
direct the host device to store the copy of the infrequently accessed data to the second storage tier;
receive an indication that the copy of the infrequently accessed data has been stored to the second storage tier; and
designate the infrequently accessed data in the first storage tier as invalid data.

4. The apparatus of claim 2 comprising the circuit further configured to:
provide the copy of the infrequently accessed data in response to an infrequently accessed data query from the host.

5. The apparatus of claim 2 further comprising:
the log of data accesses includes requests for data on the second storage tier; and
the circuit further configured to maintain a list of data to promote from the second storage tier to the first storage tier based on the log of data accesses.

6. The apparatus of claim 1 comprising the circuit further configured to:
maintain a second address map for the second storage tier; and
when the specified data does not exist on the first storage tier and does exist on the second storage tier, return the indication including addressing information for the specified data.

7. The apparatus of claim 1 further comprising:
the apparatus is the data storage device in the first storage tier;
the circuit configured to:
receive the read request from a requesting controller of the plurality of host devices;
return the specified data to the requesting controller when the data exists on the first storage tier; and
return the indication to query the second storage tier to the requesting controller when the specified data does not exist on the first storage tier, the indication including instruction on where to locate the specified data.

8. The apparatus of claim 7 further comprising:
the first address map includes addressing information for a subset of addresses associated with the first storage tier, the subset corresponding to addresses associated with the data storage device.

9. The apparatus of claim 8 further comprising:
the addresses associated with the first storage tier includes addresses for data stored to the first storage tier and the second storage tier; and
the addresses associated with the data storage device includes addresses of data stored to the data storage device and one or more storage devices of the second storage tier.

10. The apparatus of claim 1 further comprising:
a server housing including:
a first data storage device of the first storage tier including the circuit and the first type of storage medium;
a second data storage device of the second tier including the second type of storage medium; and
a server controller configured to issue the read request for the specified data.

11. A system comprising:
a first storage tier including a first storage device having a first type of storage medium;
a second storage tier include a second storage device having a second type of storage medium;
a controller from a plurality of controllers configured to access the first storage tier and the second storage tier, the controller configured to:
direct a read request for specified data to the first storage tier;
receive an indication from the first storage tier to query the second storage tier when the specified data is not stored to the first storage tier; and
direct a read request for the specified data to the second storage tier.

12. The system of claim 11 comprising:
the first storage device configured to monitor data accesses to determine infrequently accessed data;
the controller configured to:
query the first storage device regarding infrequently accessed data;
retrieve the infrequently accessed data from the first storage device based on a response to the query; and
store the infrequently accessed data to the second storage tier.

13. The system of claim 11 comprising:
the first storage device further configured to:
determine infrequently accessed data stored in a selected area of the first storage device that is near to a trigger for performing a defragmentation operation; and
provide a copy of the infrequently accessed data stored in the selected area in response to the query regarding infrequently accessed data; and
perform the defragmentation operation, including copying valid data from the selected area to an available area of the first storage tier, the valid data not including the infrequently accessed data.

14. The system of claim 13 comprising:
the first storage device further configured to:
direct the controller to store the copy of the infrequently accessed data to the second storage tier;

receive an indication that the copy of the infrequently accessed data has been stored to the second storage tier; and designate the infrequently accessed data in the first storage tier as invalid data.

15. The system of claim 11 comprising:

the second storage device configured to monitor data accesses to determine frequently accessed data;

the controller configured to:

query the second storage device regarding frequently accessed data;

retrieve the frequently accessed data from the first storage device based on a response to the query; and store the frequently accessed data to the first storage tier.

16. The system of claim 11 comprising:

the first storage device configured to:

maintain a log of data requests for data on the second storage tier; and send an indication to the controller to promote from the second storage tier to the first storage tier based on the log of data requests.

17. The system of claim 11 comprising:

the controller further configured to submit data requests for a selected range of logical block addresses (LBAs) to the first storage device, the selected range of LBAs corresponding to data stored to the first storage device and the second storage tier;

the first storage device configured to:

maintain an address map for data stored to the first storage device; and send the indication to the controller in response to a request for the specified data when the specified data is not stored to the first storage device.

18. The system of claim 17 comprising:

the second storage tier includes a plurality of storage devices including the second storage device.

19. The system of claim 18 comprising:

the first storage device further configured to:

maintain mapping information for the plurality of storage devices of the second storage tier;

determine a specific storage device corresponding to the LBA of the specified data when the specified data is not stored to the first storage device; and send the indication to the controller including addressing information for the specific storage device.

20. A system comprising:

a first data storage tier including a first data storage device having a controller;

a second data storage tier including at least one other data storage devices;

the controller configured for managing data access requests to the first data storage tier and the second data storage tier, including:

servicing access requests for a tiered storage system, including the first data storage tier and the second data storage tier, received from a plurality of host devices;

receiving a data access request for selected data from a host of the plurality of host devices;

determining whether the selected data is located at the first data storage tier; and directing the host to query the second data storage tier when the selected data is not located at the first data storage tier.

* * * * *